May 14, 1957  M. W. KELLY  2,791,954
DEPTH GAUGE CONTROL FOR TRACTOR MOUNTED AGRICULTURAL
IMPLEMENTS

Filed March 12, 1954  2 Sheets-Sheet 1

INVENTOR.
Murel W. Kelly
BY Victor J. Evans & Co.
ATTORNEYS

May 14, 1957 M. W. KELLY 2,791,954
DEPTH GAUGE CONTROL FOR TRACTOR MOUNTED AGRICULTURAL
IMPLEMENTS
Filed March 12, 1954 2 Sheets-Sheet 2
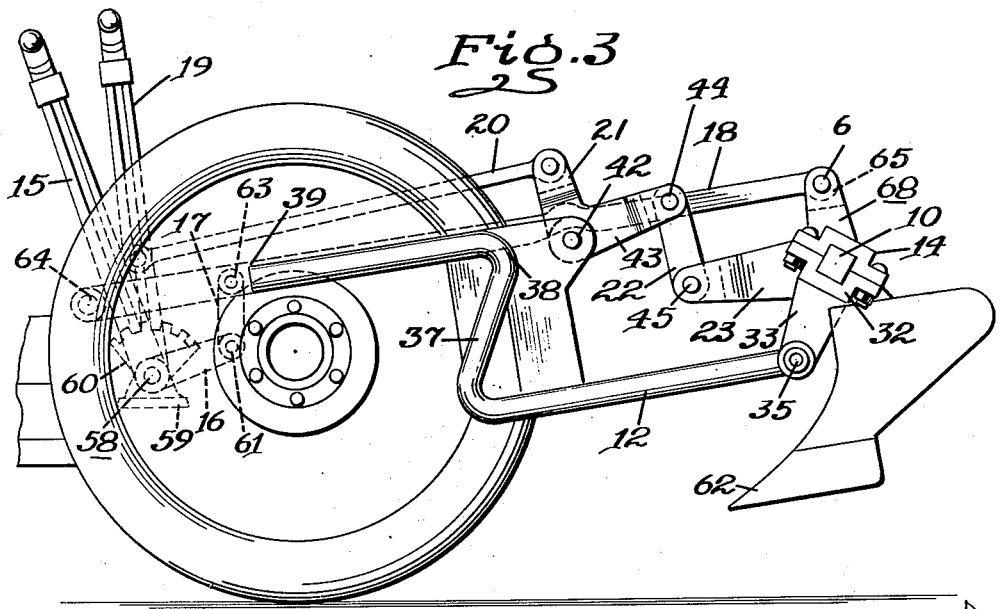
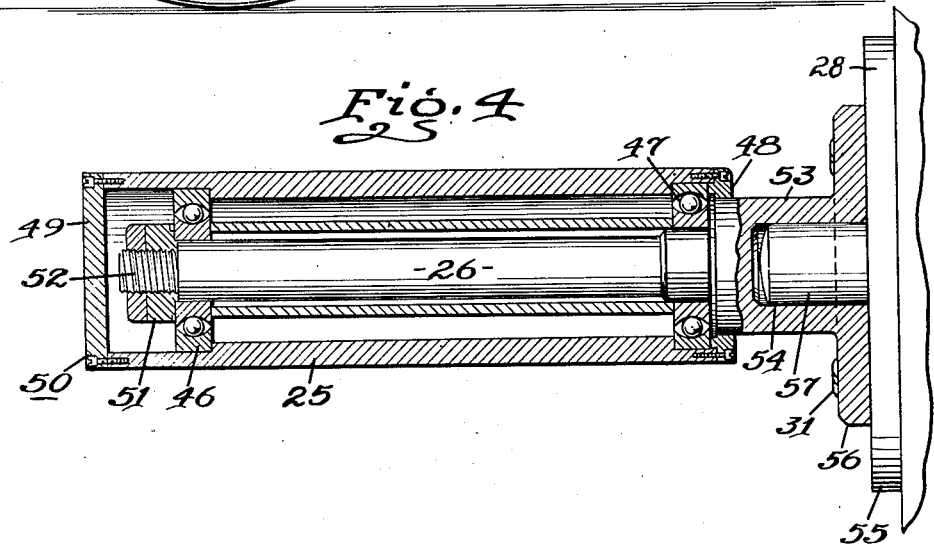
INVENTOR.
Murel W. Kelly
BY Victor J. Evans & Co.
ATTORNEYS

United States Patent Office 2,791,954
Patented May 14, 1957

2,791,954

DEPTH GAUGE CONTROL FOR TRACTOR MOUNTED AGRICULTURAL IMPLEMENTS

Murel W. Kelly, Mangum, Okla.

Application March 12, 1954, Serial No. 415,737

5 Claims. (Cl. 97—47.62)

This invention relates to farm implements and particularly attachments for cultivators, plows, and the like, and in particular a depth gauge incorporated in a mounting for plows or cultivators on a tractor whereby with the depth gauge set so that a plow share penetrates the ground to a certain distance the plow may be elevated for transportation or to pass an obstruction and when use thereof is again desired the plow may be lowered to penetrate the ground to the same distance as before without the use of gauge wheels and the like.

In conventional depth gauge attachments wheels are set at points adjacent cultivator shovels or plow shares whereby with the wheels traveling over the ground the depth of penetration is positively controlled. For certain types of equipment depth gauge wheels traveling on the ground are objectionable and with this thought in mind this invention contemplates a depth gauge that is controlled by extensions at the ends of an axle or from the sides of wheels of a tractor or towing vehicle whereby upon the return of cultivators or plows to operative positions depth gauge bars engage upper surfaces of rotating elements extended from wheels of the towing vehicle and thereby control the penetration of the elements in the ground.

The object of this invention is, therefore, to provide means for controlling the depth of penetration of plows and the like in the ground without using conventional depth gauge wheels.

Another object of the invention is to provide a depth gauge attachment for farm implements that is adapted to be installed on implements now in use.

A further object of the invention is to provide a depth gauge attachment that controls the penetration of plows and the like into soil from a towing vehicle in which the device is of a simple and economical construction.

With these and other objects and advantages in view the invention embodies a mounting bar suspended by hand crank actuating levers from the housing of a tractor with means, also actuated by a hand lever for adjusting the position of a plow carried by the mounting bar and with Z-shaped gauge bars connected to the mounting bar and adapted to rest upon rotatable sleeves extended from hubs of wheels of a tractor upon which the device is mounted.

Other features and advantages of the invention will appear from the following description taken in connection with the drawings, wherein:

Figure 3 is a side elevational view, similar to that shown in Fig. 1 with the parts illustrated in elevated positions and with the forward part of the tractor broken away.

Figure 4 is a longitudinal section through a sleeve rotatably mounted on the hub of each wheel of the tractor, the sleeves being positioned to receive extended ends of each of the Z-shaped gauge bars.

Figure 1:
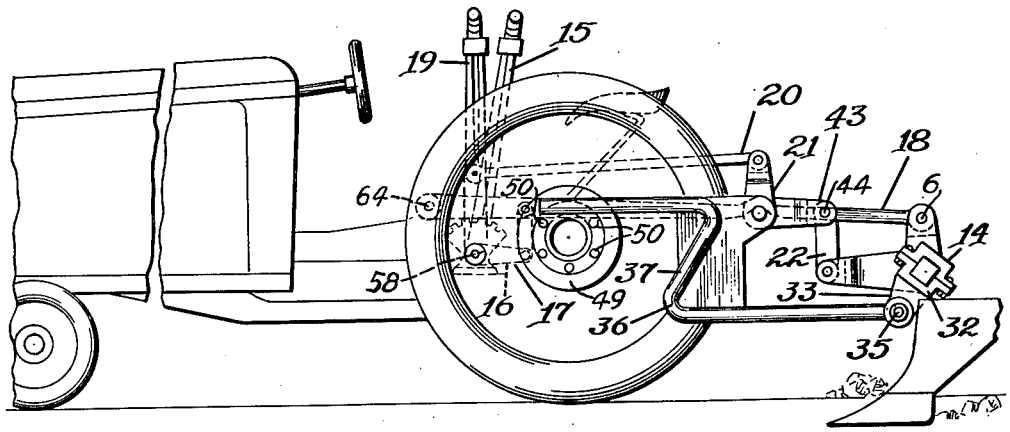
Figure 1 is a side elevational view illustrating the position of the depth gauge attachment on a tractor with the forward part of the tractor broken away.
Figure 2:
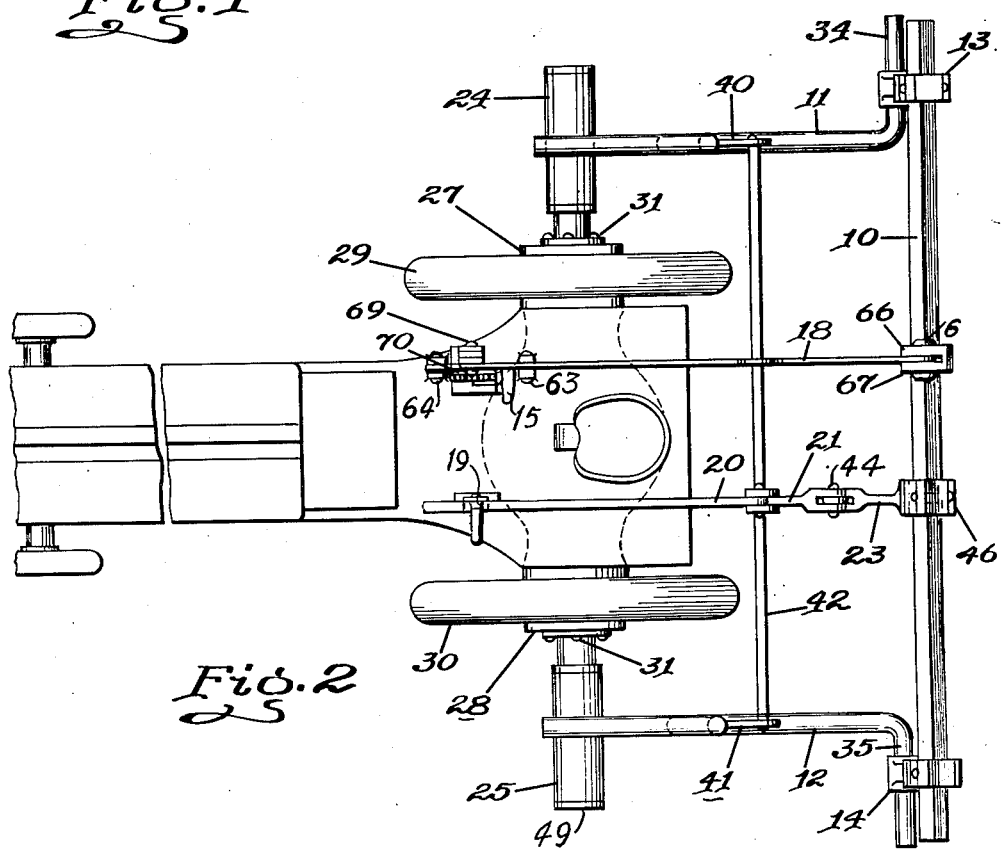
Figure 2 is a plan view of the depth gauge attachment with the parts as shown in Fig. 1 and also with the forward end of the tractor broken away.

Referring now to the drawings wherein like reference characters denote corresponding parts the improved depth gauge of this invention includes a mounting bar 10, gauge bars 11 and 12 secured to the mounting bar with clamps 13 and 14, respectively, a hand lever 15 for raising and lowering the mounting bar and plow share carried thereby through an arm 16, a link 17 and a rod 18. The device also includes a hand lever 19 for adjusting the positions of the cultivators or plow shares through a rod 20, a bell crank 21, a link 22, an arm 23 which extends from the mounting bar 10, and sleeves 24 and 25 that are rotatably mounted on stub shafts 26 which are secured to the hubs 27 and 28 of wheels 29 and 30 respectively with bolts 31.

In the design shown, the mounting bar 10 is square. However, it will be understood that the bar may be of any suitable shape, and the parts may be secured thereto by suitable means. With the mounting bar square the clamps 13 and 14 include U-shaped upper sections or caps as shown in Fig. 1, and U-shaped lower sections, as indicated by the numeral 32, and which are provided with bearings 33 through which ends 34 and 35 of the gauge bars 11 and 12 respectively, extend. From the ends 34 and 35 the gauge bars extend forwardly to points 36 and from the points 36 the bars are inclined with sections 37 extended to points 38 and from the points 38 the bars extend forwardly to points 39. The extended ends of the gauge bars are adapted to ride upon the sleeves 24 and 25 of the shafts 26 which are mounted on the outer ends of the hubs of the wheels 29 and 30.

The gauge bars 11 and 12 are provided with gusset plates 40 and 41 in which the ends of a rod 42 are mounted and the rod 42 provides mounting means for a bell crank 21. A bifurcated horizontally disposed arm 43 of the bell crank 21 is pivotally connected with a pin 44 to the link 22 and the lower end of the link 22 is connected by a pin 45 to the arm 23 which extends forwardly from a clamp 46 on the mounting bar 10.

The extended ends of the gauge bars 11 and 12 are positioned to rest upon the sleeves 24 and 25 which, as illustrated in Fig. 4, are rotatably mounted on the stud or shaft 26 with bearings 46 and 47, the ends of the sleeves in which the bearings 47 are positioned being sealed with sealing rings 48 and the opposite end being closed with plates 49 that are secured by screws 50 to the ends of the rollers. The bearing 46 is secured on the end of the stud 26, of each roller with a nut 51 that is threaded on a stud 52. The sleeves may be provided in different lengths to compensate for the number of plows or the products being worked.

As illustrated in Fig. 4 the stud 26 of each roller or sleeve is provided with a base 53 having a socket 54 therein and the studs are mounted on base plates 55 with the screws 31 extending through flanges 56 of the studs and into the base plates. The base plates 55 are provided with pins 57 that extend into the sockets 54 of the studs.

The base plates 55 are secured to the ends of the hubs of the wheels with the conventional wheel mounting bolts whereby the sleeves or rollers are adapted to be readily removed and replaced.

The hand lever 15 is pivotally mounted by a pin 58 in a base 59 of a segment 60, as shown particularly in Fig. 3 and upon rearward movement of the hand lever 15 the arm 16 which is pivotally connected to the link 17 with a pin 61 draws the rod 18 downwardly from the position shown in Fig. 3 to that shown in Fig. 1 wherein the plow shares, as indicated by the numeral 62 enter the soil, as shown in Fig. 1. The upper end of the link 17 is pivotally connected to the rod 18 with a pin 63 and the forward end of the rod 18 is pivotally mounted on the tractor housing by a pin or bolt 6.

By this means the cultivator or plow shares are suspended directly from the rear axle housing of a tractor whereby the weight is applied to the wheels of the tractor increasing the traction of the wheels; whereas with conventional depth gauge wheels, the wheels take the load of the plows and supporting frame therefor.

The trailing end of the rod 18 is pivotally mounted on the mounting bar 10 with a pin 64 that extends through a hub 65 on the end of the rod 18 and bifurcated sections 66 and 67 at the upper end of an arm 68.

The hand lever 19 is pivotally mounted by a pin 69 on a bearing stand 70 and with the bearing stand 70, base 59 of the segment 60 and rotatable sleeves 24 and 25 mounted on a tractor, as illustrated in the drawings, cultivators or plows carried by the mounting bar 10 are adapted to be raised and lowered and upon lowering the plows the gauge bars 11 and 12 stop the downward movement with the plows penetrating the ground to a predetermined amount.

The depth gauge control device of this invention is adapted to be used with cultivators and plows of different sizes and designs and the length of the mounting bar 10 and rotatable sleeves 24 and 25 may be increased or decreased depending upon the plows being carried by the device or the crops being worked.

It will be understood that modifications, within the scope of the appended claims, may be made in the design and arrangement of the parts without departing from the spirit of the invention.

What is claimed is:

1. A depth gauge mechanism comprising a mounting bar, gauge bars extended forwardly from said mounting bar, manually actuated means for raising and lowering the mounting bar, and rotatable sleeves adapted to be mounted on wheels of a towing vehicle for limiting downward movement of said gauge bars for regulating the penetration of the devices carried by the mounting bar into the ground.

2. A depth gauge mechanism comprising a mounting bar, a rod adapted to be pivotally mounted on a tractor at one end and said bar being pivotally connected to the mounting bar at the other, a hand lever operatively connected to said rod for elevating the extended end of the rod with the mounting bar carried thereby, gauge bars carried by the mounting bar and extended forwardly therefrom, and rotatable sleeves adapted to be mounted on wheels of a tractor and positioned to be engaged by said gauge bars for limiting downward movement of gauge bars, mounting bars, and ground engaging elements carried by said mounting bars.

3. In a depth gauge mechanism, the combination which comprises a transversely disposed mounting bar, a rod pivotally connected to the mounting bar and extended forwardly therefrom, said rod adapted to be pivotally connected to a tractor, a hand lever adapted to be pivotally mounted on the tractor and operatively connected to said rod for raising and lowering the extended end of the rod and the mounting bar carried thereby, rotatable sleeves adapted to be mounted on wheels of a tractor and extended from sides of the tractor, and Z-shaped gauge bars carried by the mounting bar and positioned to engage said rotatable sleeves to limit downward movement of the mounting bar.

4. In a depth gauge mechanism, the combination which comprises a mounting bar adapted to be transversely positioned in relation to a towing tractor, a rod pivotally mounted on the mounting bar and extended forwardly, said rod adapted to be connected to a tractor, a hand lever operatively connected to said rod and adapted to be mounted on a tractor for actuating the rod to raise and lower the mounting bar, rotatable sleeves adapted to be mounted on wheels of a tractor with the sleeves extended laterally from the tractor, gauge bars carried by the mounting bars and positioned to ride on said sleeves, a bell crank pivotally mounted on said gauge bars and operatively connected to the mounting bar for rotating the mounting bar and a hand crank operatively connected to the bell crank and adapted to be pivotally mounted on a tractor for operating the mounting bar to the bell crank.

5. In a depth gauge mechanism, the combination which comprises an elongated square mounting bar having an arm extended upwardly therefrom, a rod pivotally connected to the arm of the mounting bar and adapted to be pivotally connected to the tractor, a hand lever for elevating the mounting bar adapted to be pivotally mounted on the tractor and operatively connected to said rod, stub shafts adapted to be connected to hubs of wheels of a tractor with stub shafts extended laterally from the tractor, sleeves rotatably mounted on said stub shafts, Z-shaped gauge bars carried by the mounting bar and extended for engagement with sleeves of the studs, a shaft carried by said gauge bars, a bell crank mounted on said shaft, an arm extended forwardly from the mounting bar, a link connecting one arm of the bell crank to the arm extended forwardly of the mounting bar, a hand lever for turning the mounting bar adapted to be pivotally mounted on a tractor, and a rod connecting an arm of the bell crank to the hand lever for turning the mounting bar, and ground engaging implements adapted to be carried by said mounting bar.

References Cited in the file of this patent

UNITED STATES PATENTS

| | | |
|---|---|---|
| 1,378,432 | Towle | May 17, 1921 |
| 1,707,410 | Neusiis | Apr. 2, 1929 |
| 2,140,144 | Silver | Dec. 13, 1938 |
| 2,145,007 | Foster | Jan. 24, 1939 |
| 2,580,532 | Dugger | Jan. 1, 1952 |
| 2,593,176 | Patterson | Apr. 15, 1952 |
| 2,663,240 | Bauer | Dec. 22, 1953 |